(12) United States Patent
Baumann et al.

(10) Patent No.: US 11,547,961 B2
(45) Date of Patent: Jan. 10, 2023

(54) FILTER ELEMENT AND FILTER ASSEMBLY

(71) Applicant: MANN+HUMMEL GmbH, Ludwigsburg (DE)

(72) Inventors: Christoph Baumann, Moeglingen (DE); Oliver Glueck, Stuttgart (DE); Guenter Jokschas, Murrhardt (DE); Idriss Razgani, Tangier (MA); Dietmar Talmon-Gros, Oberstenfeld (DE); Martin Weindorf, Kornwestheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 90 days.

(21) Appl. No.: 17/034,645

(22) Filed: Sep. 28, 2020

(65) Prior Publication Data
US 2021/0008472 A1 Jan. 14, 2021

Related U.S. Application Data

(63) Continuation of application No. PCT/EP2019/057975, filed on Mar. 29, 2019.

(30) Foreign Application Priority Data

Mar. 29, 2018 (DE) ...................... 10 2018 002 623.0

(51) Int. Cl.
*B01D 29/96* (2006.01)
*B01D 29/21* (2006.01)
(Continued)

(52) U.S. Cl.
CPC ............. *B01D 29/96* (2013.01); *B01D 29/21* (2013.01); *B01D 35/147* (2013.01); *B01D 35/16* (2013.01);
(Continued)

(58) Field of Classification Search
CPC ...... B01D 29/96; B01D 29/21; B01D 35/147; B01D 35/16; B01D 35/30;
(Continued)

(56) References Cited

U.S. PATENT DOCUMENTS 10,159,918 B2   12/2018   Ardes
10,350,530 B2   7/2019    Stark et al.
(Continued)

FOREIGN PATENT DOCUMENTS

DE       19848978 A1       4/2000
DE    102015208426 A1      11/2016

*Primary Examiner* — Waqaas Ali

(57) ABSTRACT

A filter element has a first follower element with a first traction surface and a second follower element with a second traction surface provided for interacting with first and second mating surfaces of the filter housing, respectively. The first and second traction surfaces interact with the first and second mating surfaces to pull out the filter element from the filter housing. The first and second traction surfaces are spaced apart from each other along a longitudinal axis of the filter element and project radially into the interior of the filter element. At least one of the first and second follower elements has a stop surface adjoining circumferentially the respective traction surface. In a position of use, the stop surface interacts with a counter stop surface of the filter housing to form an at least unidirectional rotational degree of freedom blocking about the longitudinal axis relative to the filter housing.

15 Claims, 11 Drawing Sheets

(51) Int. Cl.
*B01D 35/147* (2006.01)
*B01D 35/16* (2006.01)
*B01D 35/30* (2006.01)

(52) U.S. Cl.
CPC ...... *B01D 35/30* (2013.01); *B01D 2201/0415* (2013.01); *B01D 2201/305* (2013.01); *B01D 2201/4007* (2013.01); *B01D 2201/4076* (2013.01)

(58) Field of Classification Search
CPC ...... B01D 2201/0415; B01D 2201/305; B01D 2201/4007; B01D 2201/4076; B01D 2201/4015; B01D 2201/4046; B01D 35/153
See application file for complete search history.

(56) References Cited

U.S. PATENT DOCUMENTS

| | | |
|---|---|---|
| 2004/0094464 A1 | 5/2004 | Baumann et al. |
| 2011/0303600 A1 | 12/2011 | Honermann et al. |
| 2014/0366494 A1 | 12/2014 | Ardes |
| 2015/0157968 A1* | 6/2015 | Ardes ................ B01D 35/153 210/232 |
| 2015/0367265 A1 | 12/2015 | Grass et al. |
| 2017/0361252 A1 | 12/2017 | Vogt et al. |

* cited by examiner

FILTER ELEMENT AND FILTER ASSEMBLY

CROSS-REFERENCE TO RELATED APPLICATIONS

This application is a continuation application of international application No. PCT/EP2019/057975 having an international filing date of 29 Mar. 2019 and designating the United States, the international application claiming a priority date of 29 Mar. 2018 based on prior filed German patent application No. 10 2018 002 623.0, the entire contents of the aforesaid international application and the aforesaid German patent application being incorporated herein by reference.

BACKGROUND OF THE INVENTION

The present invention concerns a filter element and a filter assembly with such a filter element.

An oil filter assembly includes an oil filter that is accommodated inside a filter housing. The filter housing, in turn, comprises a filter housing pot, which, for example, is fixedly connected to a support structure of a vehicle, and a filter housing cover screwed onto the filter housing pot. In particular when using such oil filter assemblies in trucks, very large dimensions of the oil filter result. It is therefore difficult for a user to exchange the oil filter. Therefore, the oil filter can be coupled by means of entrainment contours to the filter housing cover so that the oil filter, upon removal of the filter housing cover from the filter housing pot, can be pulled out of the latter.

DE 10 2015 208 426 A1 discloses a filter assembly with a filter element that comprises a plurality of bayonet wings projecting into an interior thereof. These bayonet wings interact with corresponding bayonet wings provided at a filter housing cover. In this context, all bayonet wings at the filter element as well as all bayonet wings at the filter housing cover are arranged at the same level, respectively, relative to a longitudinal direction of the filter elements.

DE 10 2017 005 619 A1 discloses a filter assembly with a filter element that is accommodated in a filter housing. The filter element is coupled by means of a bypass valve housing with a filter housing cover. The bypass valve housing comprises for this purpose follower contours that engage corresponding follower contours of the filter element. In this context, the follower contours at the bypass valve housing as well as the follower contours at the filter element are arranged at the same level, respectively, relative to a longitudinal direction of the filter element.

SUMMARY OF THE INVENTION

It is therefore the object of the invention to make available an improved filter element.

Accordingly, a filter element, in particular an oil filter element, is proposed with a first traction surface that is configured to interact with a corresponding first mating surface of a filter housing of the filter element and with a second traction surface that is configured to interact with a corresponding second mating surface of the filter housing. The filter element includes a filter medium body which surrounds an interior at least partially circumferentially.

The traction surfaces and the mating surfaces are configured to interact in such a way that the filter element by means thereof can be pulled out of the filter housing wherein the first traction surface and the second traction surface are arranged at a distance from each other along a longitudinal direction of the filter element. The filter element according to the invention can also include more than two traction surfaces; it is only essential that at least two traction surfaces are provided which are spaced apart in the longitudinal direction. However, the additional traction surfaces can also not be spaced apart in the longitudinal direction. In a preferred embodiment with more than two traction surfaces, all traction surfaces are however displaced relative to each other axially in longitudinal direction.

Moreover, the filter element includes according to the invention a first follower element that includes the first traction surface and a second follower element that includes the second traction surface, wherein the first traction surface and the second traction surface project radially into the interior of the filter element that is at least partially circumferentially surrounded by the filter medium body.

Moreover, the first follower element and/or the second follower element includes a stop surface that is present so as to adjoin circumferentially the traction surfaces of the first and/or of second follower element and that is configured to interact in an arrangement of use with a corresponding counter stop surface of the filter housing for forming an at least unidirectionally acting rotational degree of freedom blocking about the longitudinal axis relative to the filter housing. The counter stop surface can be arranged in particular on at least one follower counter element of the filter housing at which preferably also the mating surfaces are present. In particular, the counter stop surface can be formed by a surface of the follower counter element that extends at least partially with a radial component so that, by relative rotation of the filter element relative to the filter housing part, the filter element-associated stop surface contacts the filter housing-associated counter stop surface. Due to the immediately adjoining arrangement of the traction surfaces and stop surfaces as well as their relative angular position, at least one substantially L-shaped inwardly positioned bayonet hook is preferably formed on the part of the filter element, preferably a plurality of L-shaped bayonet hooks distributed about the inner circumference.

The filter element includes preferably a raw side and a clean side. The fluid to be purified flows from the raw side through the filter element of the filter medium body to the clean side. The clean side in this context is preferably correlated with the interior of the filter element (flow from the exterior to the interior). However, embodiments in which the raw side is present in the interior (flow from the interior to the exterior) are also encompassed by the present invention. The first traction surface and the second traction surface projecting "radially" into the interior is to be understood such that the first traction surface and the second traction surface extend in the direction toward the symmetry axis.

The filter element is in particular configured to filter fluids, for example, air or other gases, liquids, in particular liquid operating media of a vehicle, in particular of a motor vehicle, such as oil, water, gasoline, kerosene or urea solution. In particular, the filter element is an oil filter element for a truck, an agricultural machine, or a construction machine. The filter element is in particular configured to separate contaminants, in particular particles and suspended matter, from oil. The filter element can be used in motor vehicles, watercraft, rail vehicles, agricultural vehicles, construction machines, aircraft, or the like. Moreover, the filter element can also be used in immobile applications, for example, in building technology.

Herein, "radially projecting" is understood in particular as "with at least one radial component" and the meaning is not limited to a radial direction in a strict sense, even though this is preferred, so that embodiments in which the extension direction of the traction surfaces is just not strictly radial but corresponds to a direction of a secant are also encompassed by this feature.

According to a preferred embodiment, the filter medium body surrounds the interior completely circumferentially.

Herein, "unidirectional" refers to blocking of a relative rotational degree of freedom in one rotational direction in regard to the rotational degree of freedom blocking. The afore described rotational degree of freedom blocking is in particular acting exclusively unidirectionally in order to enable "catching" of the filter element by the filter housing component, in particular when screwing on a housing cover, i.e., bringing the traction surfaces and the mating surfaces into functional contact with each other.

Perpendicular or normal means in particular at a right angle.

In a special embodiment, it can be provided that the stop surface is oriented substantially normal to the traction surface and/or preferably projects substantially parallel to a longitudinal axis of the filter element radially into the interior. Due to this orientation of the stop surface, a particularly effective relative rotational degree of freedom blocking is achieved by form-fit functional contact.

In a preferred embodiment, each of the traction surfaces has correlated therewith its own stop surface.

The filter element is in particular constructed substantially with rotational symmetry relative to a center axis or symmetry axis. The longitudinal direction in this context is oriented parallel or along the symmetry axis. Preferably, the filter element includes a first end disk and a second end disk between which a folded filter medium is arranged; however, it is not mandatory that the filter medium be folded. The first end disk and the second end disk can be glued, cast, fused or welded to the filter medium. In particular, the first end disk and the second end disk are provided at an end face of the filter medium, respectively. The first end disk and/or the second end disk can be manufactured, for example, of a metal material, in particular of a sheet metal. Alternatively, the first end disk and the second end disk can also be manufactured of a plastic material and/or of a foam material, in particular a thermally foamable material. The longitudinal direction in this context can be oriented from the second end disk in the direction toward the first end disk or in reverse.

Preferably, the first traction surface includes a predetermined distance to an end disk, in particular to the first end disk, and the second traction surface includes a predetermined distance to the corresponding end disk, wherein the distance of the second traction surface from the end disk is greater than the distance of the first traction surface from the end disk. The two traction surfaces are therefore positioned spaced apart from each other at a predetermined distance, wherein this distance results from the absolute value of the difference of the aforementioned distances of the traction surfaces relative to the respective end disk. In particular, the first traction surface is arranged separate from the second traction surface. This means that the first traction surface does not coincide with the second traction surface. The traction surfaces and the mating surfaces can be part of a bayonet closure.

Preferably, the filter element and the filter housing are part of a filter assembly, in particular of an oil filter assembly. The filter assembly includes preferably a filter housing cover to which the filter element can be coupled for pulling out the latter from a filter housing pot of the filter housing. This means that the filter element can be pulled out of the filter housing pot by means of the filter housing cover. The filter housing cover can comprise the mating surfaces. In particular, the mating surfaces can be provided at a follower device that is coupled to the filter housing cover.

Due to the fact that the first traction surface and the second traction surface are arranged at a distance from each other along the longitudinal direction, a key-lock system can be realized whereby filter elements that are not suitable cannot be mounted in the filter housing and in particular cannot be demounted therefrom again. In particular, a so-called error-avoiding poka-yoke principle can be realized. A faulty mounting of the filter element, for example, in a service situation, is thus reliably prevented.

In embodiments, the first traction surface and the second traction surface each form a plane oriented perpendicularly to the longitudinal direction, respectively. This means that the first traction surface and the second traction surface are not curved or arched, respectively, and also preferably not inclined relative to the longitudinal direction. The first traction surface and the second traction surface form thus preferably a flat geometry, respectively.

In embodiments, the filter element includes moreover a support tube at which the first traction surface and the second traction surface are provided. The first traction surface and the second traction surface can alternatively be provided also at one of the end disks. The support tube is preferably arranged within the filter medium and supports the latter at the inner side. The first end disk and the second end disk are provided at the end faces at the support tube, respectively. In this context, the first end disk, the second end disk, and the support tube can form a support structure of the filter element. The support structure can be embodied as one piece, in particular monolithic. For example, the support structure is an injection molded plastic part. Alternatively, the support structure can also comprise or be comprised of metal or a metal alloy. The support tube is grid-shaped and fluid-permeable. Alternatively, the filter element can comprise an end disk which is present at a first longitudinal end face of the filter element, wherein the end disk preferably includes a collar sleeve section which extends at least along a longitudinal axis section into the interior and wherein preferably the first traction surface and the second traction surface are present at the collar sleeve section. Such a configuration is suitable in principle also for filter elements without central tube. The end disk can be, for example, a plastic end disk that can be welded to the filter medium, for example.

Preferably, the first follower element and the second follower element are provided at the support tube. Alternatively, the follower elements can also be provided at one of the end disks. In particular, the first follower element and the second follower element extend radially into the interior of the filter element. The follower elements are preferably part of the aforementioned bayonet closure.

In the embodiment, a first insertion groove and a second insertion groove are provided between the first follower element and the second follower element wherein the first insertion groove and the second insertion groove have a different width and/or wherein an angle between the first insertion groove and the second insertion groove is different from 180°. The number of insertion grooves is arbitrary. For example, three, four, or more insertion grooves can be provided also. Accordingly, more than two follower elements can also be provided. For example, three follower elements are provided which are positioned at an angle of 120° relative to each other. Also, four follower elements can be provided that then are positioned, for example, at an angle of 90° relative to each other. Since the first insertion groove and the second insertion groove have a different width, the already mentioned follower device can be inserted only in one predetermined position into the insertion grooves. In this way, faulty mounting is impossible. The first insertion groove and the second insertion groove can also have the same width. The angle between the first insertion groove and the second insertion groove can amount to, for example, 140°, 150°, 160° or 170°. However, the angle can also amount to 180°.

Moreover, a filter assembly, in particular an oil filter assembly, with such a filter element and a filter housing is proposed. In this context, the filter housing includes the first mating surface and the second mating surface, wherein the first mating surface and the second mating surface are arranged along the longitudinal direction of the filter housing at a distance from each other.

A distance between the mating surfaces corresponds preferably to the distance of the traction surfaces relative to each other or differs only slightly therefrom. The two aforementioned distances have preferably tolerances such that the two traction surfaces rest against the two mating surfaces. Preferably, the longitudinal direction of the filter housing corresponds to the longitudinal direction of the filter element. In particular, the filter housing is constructed substantially of rotational symmetry relative to the aforementioned symmetry axis. This means that the symmetry axis can also be correlated with the filter housing. The filter housing includes, as already mentioned, the filter housing pot and the filter housing cover that can be screwed into the filter housing pot. Preferably, the first mating surface and the second mating surface are provided at the filter housing cover. The filter housing pot includes an outlet pipe about which circumferentially an annular groove is provided. By means of the annular groove, a double-concentric sealing action of the filter element in the filter housing pot can be realized for which purpose at the filter element two concentrically arranged sealing elements can be provided.

In embodiments, the filter assembly includes moreover a follower device, in particular a bypass valve housing, connected to a filter housing cover of the filter housing, wherein the follower device includes a first follower counter element that includes the first mating surface and a second follower counter element that includes the second mating surface. The follower device can be embodied as one piece together with the filter housing cover. For example, the filter housing cover and the follower device can form a one-piece injection molded plastic part. Preferably, the follower device is however connected with form fit to the filter housing cover and is therefore separable again therefrom. The filter housing cover includes for this purpose preferably resiliently deformable connecting elements, for example, locking hooks or snap hooks, that can lock or snap into an annular section of the follower device. The follower device is preferably an injection molded plastic part. The follower elements and the follower counter elements form together in particular the aforementioned bayonet closure.

In embodiments, the first follower counter element and the second follower counter element have a different width and/or an angle between the first follower counter element and the second follower counter element is different from 180°. In this way, it is ensured that the follower device can be inserted into the aforementioned insertion grooves of the support tube. In this way, a key-lock system can be realized. The first follower counter element and the second follower counter element can also be of the same width. For example, the angle can amount to 140°, 150°, 160° or 170°. Moreover, the angle between the first follower counter element and the second follower counter element can also be equal to 180°.

In embodiments, the first follower counter element includes a first spring section and the second follower counter element a second spring section, wherein the first spring section and the second spring section each are configured to resiliently deform upon loading of only one of the mating surfaces with a force so that the mating surface loaded with the force tilts relative to the longitudinal direction. Due to the tilting action of the corresponding mating surface, the filter element jams in the filter housing. In this way, it is ensured that, when using a filter element with only one traction surface, demounting thereof is no longer possible or only possible with difficulty. In this way, the motivation for faulty mounting is reduced. Instead of the spring sections, also a rocker construction with a rocker can be provided which is supported rotatably at the follower device by means of an axis of rotation. In this case, the follower counter elements can be provided at the rocker. Upon one-sided loading of the rocker, meaning that only one of the mating surfaces is loaded with a force, both mating surfaces tilt in this case relative to the longitudinal direction. This creates the aforementioned effect of jamming of the filter element. In addition, spring sections can be provided also, for example, in order to restore the rocker into an initial position.

BRIEF DESCRIPTION OF THE DRAWINGS

In the Figures, same or functionally the same elements, if nothing to the contrary is indicated, are provided with the same reference characters.

DESCRIPTION OF PREFERRED EMBODIMENTS

Figure 1:
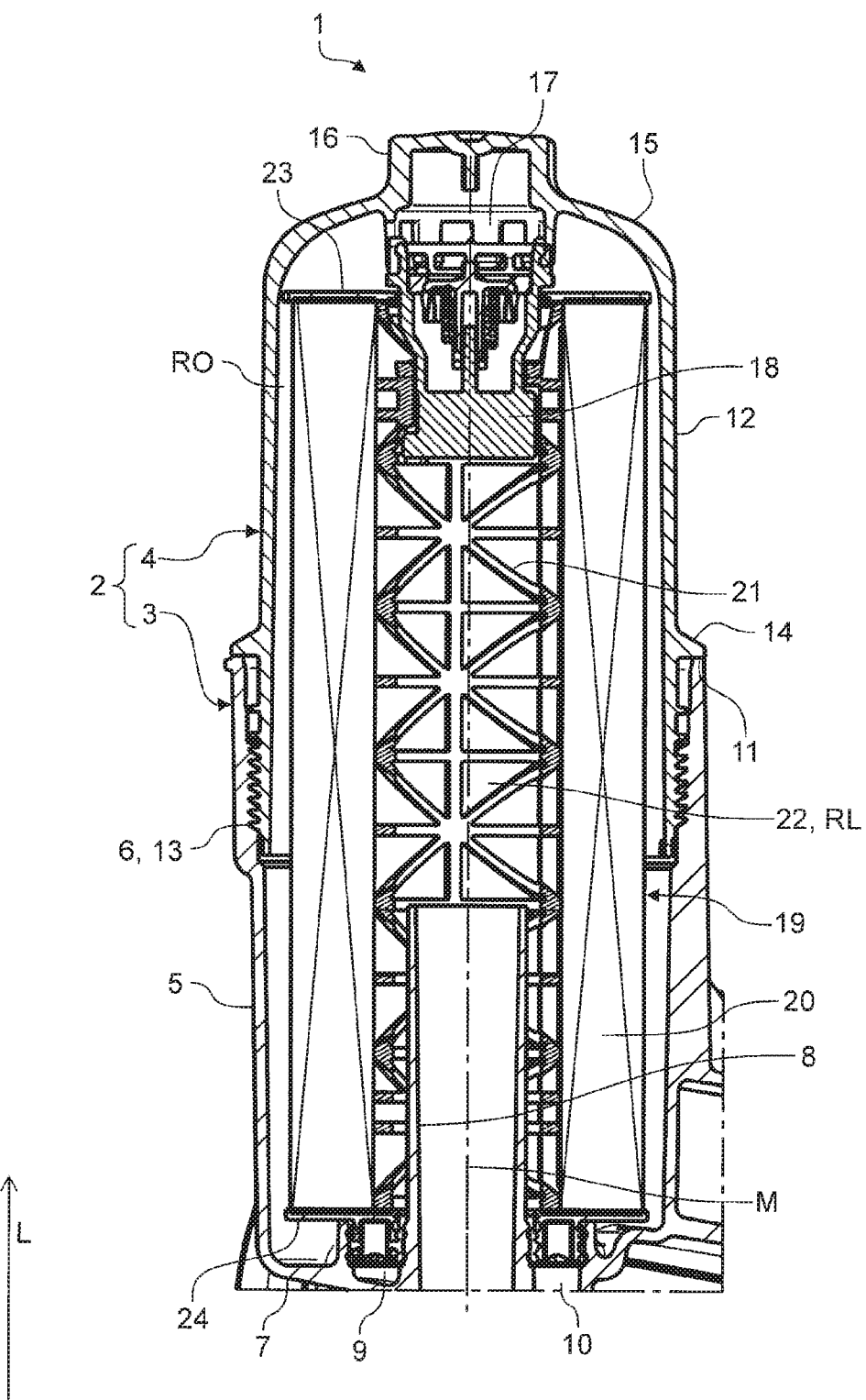
FIG. 1 shows a schematic section view of an embodiment of a filter assembly.
Figure 2:
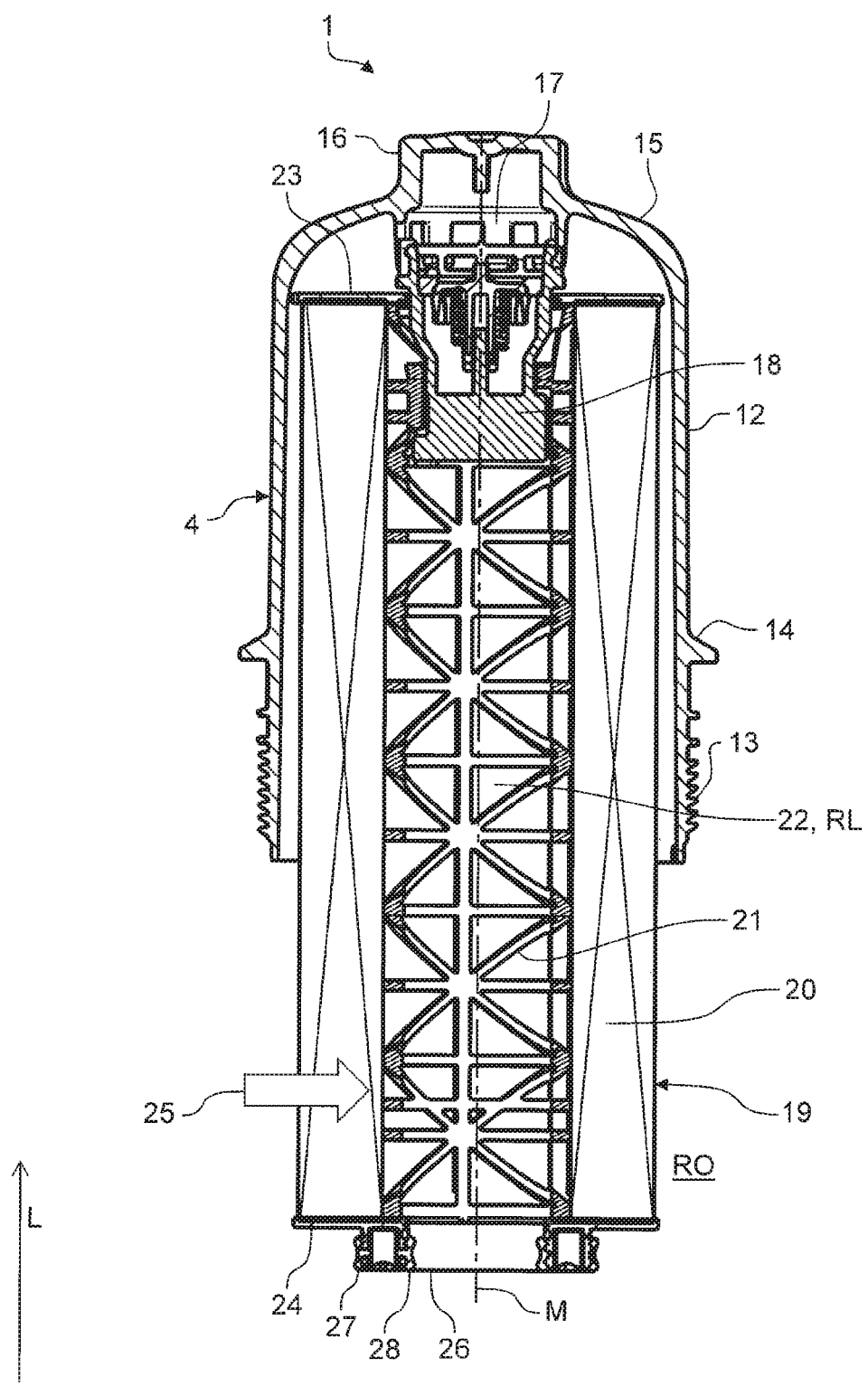
FIG. 2 shows a further schematic section view of the filter assembly according to FIG. 1.

FIGS. 1 and 2 show respectively a schematic section view of an embodiment of a filter assembly 1. The filter assembly 1 is preferably configured to filter a fluid, for example, an operating medium of a vehicle, in particular oil. The filter assembly 1 can thus be an oil filter assembly. The filter assembly 1 can be used in motor vehicles, in particular in passenger cars, trucks, agricultural vehicles or construction machines, in watercraft, in rail vehicles, in aircraft or the like. Moreover, the filter assembly 1 can also be used in immobile applications, for example, in building technology.

The filter assembly 1 includes a filter housing 2 with a filter housing pot 3 and a filter housing cover 4. The filter housing pot 3 can be fixedly connected to an internal combustion engine or a frame part of a motor vehicle. The filter housing pot 3 is manufactured, for example, of a plastic material or a metal material. The filter housing pot 3 is substantially constructed with rotational symmetry relative to a center axis or symmetry axis M.

The filter housing pot 3 includes a pot-shaped base section 5 provided at its top side with an inner thread 6. The filter housing cover 4 can be screwed into the inner thread 6. The filter assembly 1 has correlated therewith a longitudinal direction L. The longitudinal direction L is parallel to the symmetry axis M or coincides therewith. The longitudinal direction L in the orientation of FIGS. 1 and 2 is oriented from bottom to top. In reverse, the longitudinal direction L can also be oriented from top to bottom.

Furthermore, the filter housing pot 3 includes a bottom 7 with a centrally arranged outlet pipe 8 which is embodied with rotational symmetry relative to the symmetry axis M. The outlet pipe 8 extends in the orientation of FIG. 1 from below into the pot-shaped base section 5. The outlet pipe 8 forms an outlet of the filter assembly 1 through which the clean fluid, for example, filtered oil, can be discharged from the filter assembly 1. The outlet pipe 8 can be embodied as one piece, in particular monolithic, with the bottom 7. Herein, "one piece" is to be understood such that the bottom 7 and the outlet pipe 8 form a common, one-piece component. Herein, "monolithic" is to be understood such that the bottom 7 and the outlet pipe 8 are manufactured continuously of the same material.

The bottom 7 includes moreover a groove 9 which extends annularly about the outlet pipe 8. The groove 9, in turn, includes an outlet 10 through which fluid contained in the base section 5, for example, oil, can flow out upon demounting the filter assembly 1. The filter housing pot 3 includes moreover an upper edge 11 which is arranged above the inner thread 6 in the orientation of FIG. 1.

The filter assembly 1 includes furthermore the aforementioned filter housing cover 4. The filter housing cover 4 is substantially embodied with rotational symmetry relative to the symmetry axis M. The filter housing cover 4 can be manufactured of plastic material or a metal material. The filter housing cover 4 can be an injection-molded plastic part or a die-cast metal component. The filter housing cover 4 includes a tubular base section 12 which is constructed with rotational symmetry relative to the symmetry axis M. Moreover, the filter housing cover 4 includes an outer thread 13 provided at the base section 12 that is configured to engage the inner thread 6 provided at the filter housing pot 3 in order to detachably connect the filter housing cover 4 to the filter housing pot 3.

Moreover, the filter housing cover 4 includes a flange 14 which extends annularly about the base section 12 and is resting against the upper edge 11 of the filter housing pot 3 in the assembled state of the filter assembly 1 (FIG. 1). In this way, the filter housing cover 4 can be positioned along the symmetry axis M axially at the filter housing pot 3. A sealing device, not illustrated, for example, an O-ring, can be provided between the filter housing cover 4 and the filter housing pot 3.

The filter housing cover 4 includes moreover a bottom 15 that, in the orientation of FIGS. 1 and 2, closes off the base section 12 in upward direction. A grip section 16 can be provided at the bottom 15. The grip section 16 can be embodied, for example, as an external square or as a hexagon head so that the filter housing cover 4 can be gripped by means of a tool in order to screw it into the filter housing pot 3.

Facing away from the grip section 16 and positioned inside the base section 12, the filter housing cover 4 includes a plurality of connecting elements 17 only one of which is provided with a reference character in FIGS. 1 and 2. The connecting elements 17 are, for example, locking hooks or snap hooks and are deformable resiliently. The number of connecting elements 17 is arbitrary. For example, six or more than six such connecting elements 17 are provided which are distributed uniformly about the symmetry axis M. By means of the connecting elements 17, a follower device 18 is attached to the filter housing cover 4. The follower device 18 will be explained in the following.

In addition to the filter housing 2, the filter assembly 1 includes a filter element 19, in particular an oil filter element, that can be coupled by means of the follower device 18 with the filter housing cover 4. The filter element 19 is preferably constructed with rotational symmetry relative to the symmetry axis M. The longitudinal direction L or the symmetry axis M can also be correlated with the filter element 19. The filter element 19 includes a filter medium 20. The filter medium 20 is in particular formed of a web-shaped filter material folded in a zigzag shape. The zigzag-shaped filter material forms the filter element 20 as a star-shaped endless folded bellows which substantially forms a cylinder surface. The filter medium 20 can be supported from the inside by a central tube or support tube 21 that is fluid-permeable. The support tube 21 is grid-shaped or is perforated. The support tube 21 prevents collapse of the filter medium 20 in operation of the filter element 19. The support tube 21 defines an interior 22 of the filter element 19. This means that the interior 22 is surrounded by the support tube 21 wherein the support tube 21, as already mentioned, is not fluid-tight.

The filter medium 20 and the support tube 21 are arranged between a first end disk 23 and a second end disk 24. The support tube 21 and the end disks 23, 24 can be embodied as one piece, in particular monolithic. For example, the support tube 21 and the end disks 23, 24 can be embodied as a one-piece injection molded plastic part. Alternatively, the end disks 23, 24 can also be glued to or welded to the support tube 21. The support tube 21 can also be positioned loosely between the two end disks 23, 24 so that it is not fixedly connected to the end disks 23, 24. The filter medium 20 is arranged between the end disks 23, 24 wherein the end disks 23, 24 can be glued or cast to the filter medium 20 and wherein the filter medium 20 can be melted into the end disks 23, 24.

The filter element 19 includes a clean side RL as well as a raw side RO. The raw side RO is in this context provided at the exterior side between the filter housing 2 and the filter medium 20. The filter housing 2 includes an inlet, not shown, through which the fluid to be purified, for example, oil laden with particles, can be supplied to the raw side RO. The clean side RL of the filter element 19 is provided inside the support tube 21, i.e., in the interior 22. A flow direction of the filter element 19 is indicated in FIG. 2 by the reference character 25. In operation of the filter assembly 1, the fluid to be purified now flows from the raw side RO in the flow direction 25 through the filter medium 20 to the clean side RL. From the clean side RL, the purified fluid is discharged by means of the outlet pipe 8 and, for example, supplied to an oil circuit of an internal combustion engine.

At the second end disk 24, a circumferentially extending flange 26 extending away therefrom is provided at which two sealing elements 27, 28 are attached. The sealing elements 27, 28 are positioned coaxially and concentrically to each other. This means that a second sealing element 28 is positioned inside a first sealing element 27. The sealing elements 27, 28 are constructed with rotational symmetry relative to the symmetry axis M. The sealing elements 27, 28 seal the filter element 19 and in particular the second end disk 24 in the assembled state (FIG. 1) of the filter assembly 1 relative to the groove 9 provided in the filter housing pot 3. In this way, a double-concentric sealing action of the filter element 19 relative to the filter housing pot 3 is provided. Upon pulling out the filter element 19 from the filter housing pot 3, the fluid which remains in the filter housing pot 3 flows out through the outlet 10 in order to completely empty the filter housing pot 3.

Figure 3:
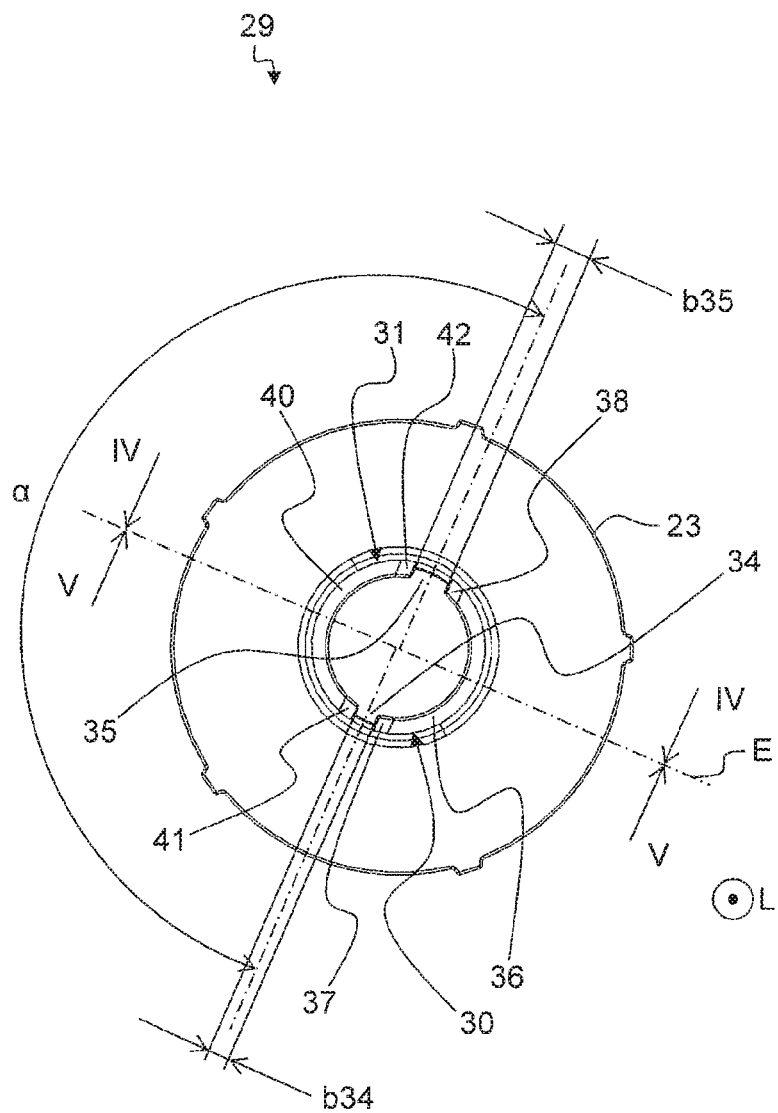
FIG. 3 shows a schematic plan view of an embodiment of a support structure for a filter element for the filter assembly according to FIG. 1.
Figure 4:
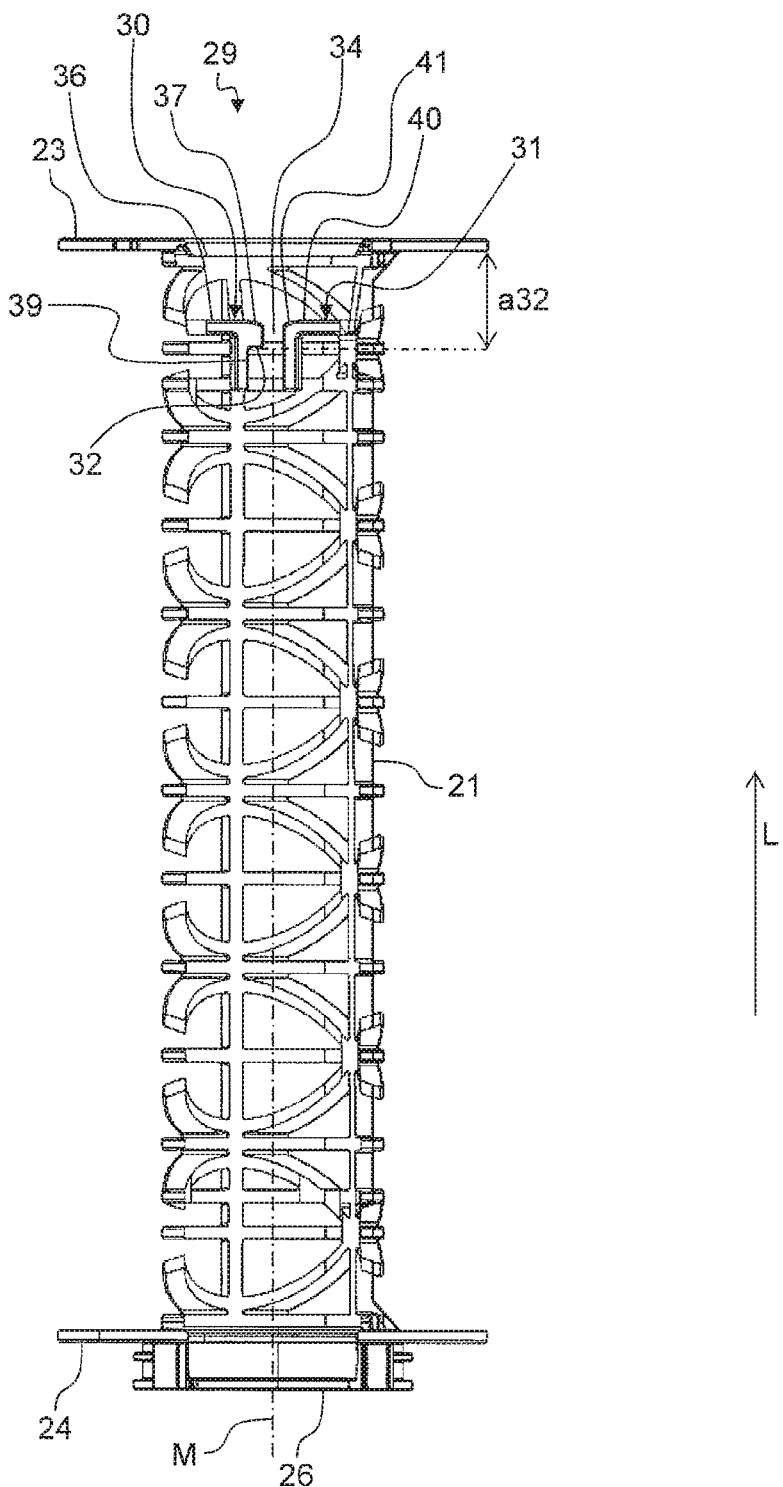
FIG. 4 shows a schematic section view of the support structure according to the section line IV-IV of FIG. 3.
Figure 5:
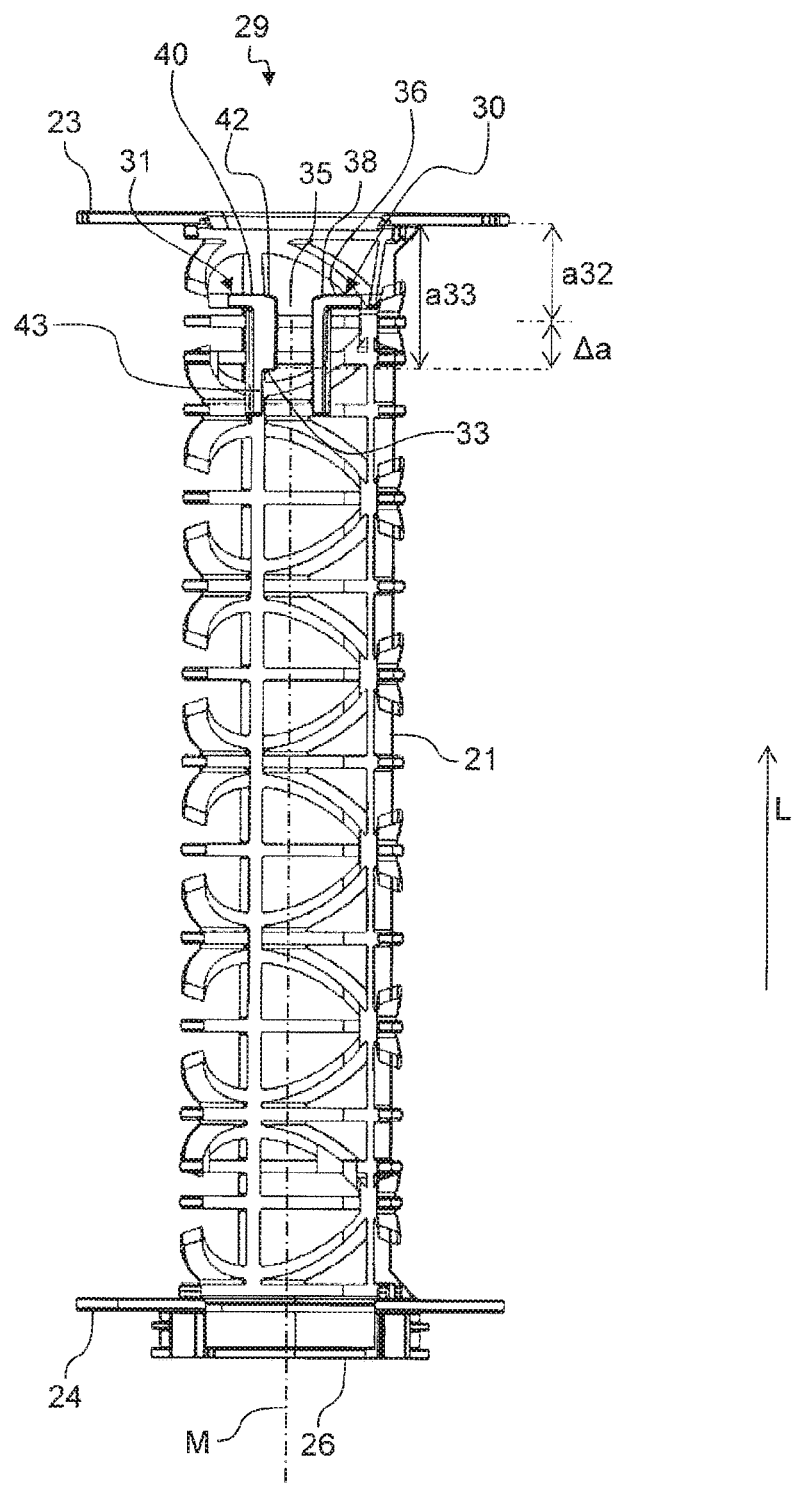
FIG. 5 shows a further schematic section view of the support structure according to section line V-V of FIG. 3.
Figure 6:
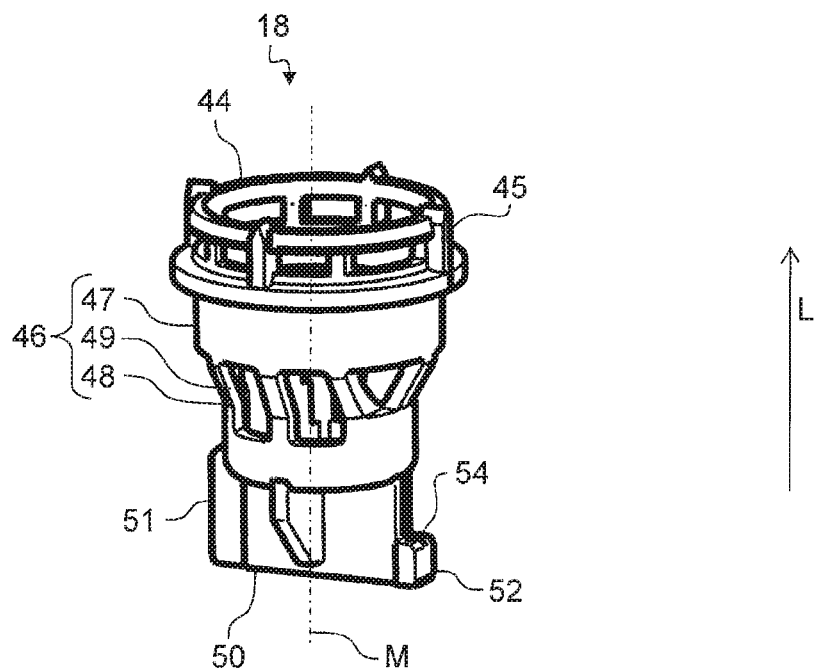
FIG. 6 shows a schematic perspective view of an embodiment of a follower device for the filter assembly according to FIG. 1.
Figure 7:
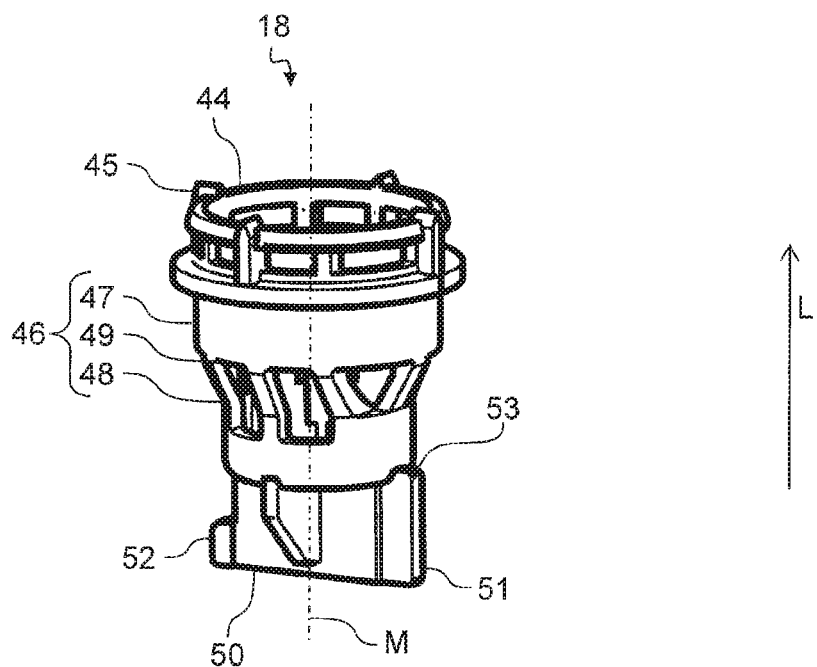
FIG. 7 shows a further schematic perspective view of the follower device according to FIG. 6.

The support tube 21 with the two end disks 23, 24 forms a support structure 29 of the filter element 19 which is illustrated in FIGS. 3 to 5. The support structure 29 is preferably constructed with rotational symmetry relative to the symmetry axis M. The longitudinal direction L or the symmetry axis M can be correlated with the support structure 29. The filter element 19 includes a first follower element 30 as well as a second follower element 31 which are preferably provided at the support structure 29. The follower elements 30, 31, as illustrated in FIGS. 3 to 5, are provided directly at the support tube 21. Alternatively, the follower elements 30, 31 can also be provided at one of the end disks 23, 24.

The number of follower elements 30, 31 is arbitrary. For example, as illustrated in FIGS. 3 to 5, two such follower elements 30, 31 can be provided. Alternatively, three, four, or more than four such follower elements 30, 31 can however be provided also. The follower elements 30, 31 are positioned opposite each other. In case that more than two follower elements 30, 31 are provided, the latter can be arranged displaced relative to each other. For example, in case of three such follower elements 30, 31, they are positioned at an angle of 120° relative to each other, respectively. In case of four such follower elements 30, 31, they are positioned relative to each other at an angle of 90°, respectively. The follower elements 30, 31 can be embodied together with the support tube 21 as one piece, in particular monolithic.

A first traction surface 32 (FIG. 4) is correlated with the first follower element 30 and a second traction surface 33 (FIG. 5) is correlated with the second follower element 31. The traction surfaces 32, 33 each form a plane, i.e., they are not arched, and are positioned perpendicularly to the longitudinal direction L or perpendicular to the symmetry axis M. This means that the traction surfaces 32, 33 do not form an inclined ramp, respectively. In this context, the first traction surface 32 and the second traction surface 33 project radially into the interior 22 of the filter element 19. Between the first follower element 30 and the second follower element 31, a first insertion groove 34 and a second insertion groove 35 are provided. Herein, "perpendicular" is to be understood preferably as an angle of 90°±10°, further preferred of 90°±5°, further preferred of 90°±1°, further preferred of precisely 90°.

The insertion grooves 34, 35 are positioned at an angle α relative to each other. The angle α can, but must not, amount to 180°. The insertion grooves 34, 35, as shown in FIG. 3, can be laterally displaced relative to each other relative to a section plane E so that the insertion grooves 34, 35 are unsymmetrically positioned relative to the section plane E. The insertion grooves 34, 35 however can also be positioned exactly opposite each other so that no lateral displacement is provided. The traction surfaces 32, 33 can correspondingly also be positioned at the angle α relative to each other.

The first insertion groove includes a width b34 and the second insertion groove 35 includes a width b35. The widths b34, b35 have a different size. For example, the width b35 is greater than the width b34. In reverse, the width b34 can also be greater than the width b35. Moreover, the two insertion grooves 34, 35 can also have the same width. In this case, the widths b34, b35 are of the same size. The traction surfaces 32, 33 are positioned perpendicularly to the correlated insertion groove 34, 35, respectively. In particular, the first traction surface 32 is correlated with the first insertion groove 34 and the second traction surface 33 with the second insertion groove 35. The traction surfaces 32, 33 form an undercut in the respective insertion groove 34, 35. This means that the respective width b34, b35 increases in the region of the corresponding traction surface 32, 33.

The first traction surface 32 and the second traction surface 33 are arranged linearly spaced apart from each other, viewed along the longitudinal direction L. In particular, the first traction surface 32 is positioned spaced apart by a distance a32 away from the first end disk 23. Correspondingly, the second traction surface 33 is positioned spaced apart by a distance a33 away from the first end disk 23. In this context, the distance a33 is greater than the distance a32. In reverse, the distance a32 can also be greater than the distance a33. In this context, the distances a32, a33 are however always of different size. For example, the distances a32, a33 differ by a distance Δa (FIG. 5). The distance Δa is the absolute value of the difference of the distances a32, a33. This means that the first traction surface 32, viewed in the longitudinal direction L, is positioned spaced apart by the distance Δa linearly away from the second traction surface 33.

The first follower element 30 includes moreover a surface 36, which is positioned perpendicularly to the longitudinal direction L or perpendicularly to the symmetry axis M, as well as two insertion ramps 37, 38. The insertion ramps are oriented at a slant relative to the longitudinal direction L. Moreover, the first follower element 30 includes also a stop surface 39 which is positioned perpendicularly to the first traction surface 32. The first traction surface 32 and the stop surface 39 define an undercut in or at the first follower element 30. Correspondingly, the second follower element 31 includes a surface 40, which is positioned perpendicularly to the longitudinal direction L or to the symmetry axis M, as well as two insertion ramps 41, 42 which are positioned at a slant relative to the longitudinal direction L. Moreover, the second follower element 31 includes a stop surface 43 which is positioned perpendicularly to the second traction surface 33. The second traction surface 33 and the stop surface 43 define an undercut in or at the second follower element 31.

Returning now to the follower device 18 illustrated in FIGS. 6 to 9. The follower device 18 can be part of the filter housing cover 4. For example, the follower device 18 can be configured as one piece together with the filter housing cover 4. Herein, the follower device 18 is however connected by means of the connecting elements 17 provided at the filter housing cover 4 with form fit to the filter housing cover 4. A form-fit connection is produced by the mutual engagement or engagement from behind of at least two connecting partners, in this case the connecting elements 17 and the follower device 18.

The follower device 18 is preferably embodied as one piece, in particular monolithic. The follower device 18 can be an injection-molded plastic part. In particular, the follower device 18 is a bypass valve housing of a bypass valve of the filter assembly 1. The follower device 18 is constructed with rotational symmetry relative to the symmetry axis M. The symmetry axis M or the longitudinal direction L can be correlated with the follower device 18.

The follower device 18 includes a circumferentially extending fastening ring or ring section 44 in which the connecting elements 17 are snapped in or locked. By means of the web sections 45, of which in FIGS. 6 to 8 only one is provided with a reference character, the ring section 44 is connected as one piece with a base section 46 of the follower device 18. The web sections 45 impact at the connecting elements 17 or are positioned between them so that the follower device 18 is secured rotationally at the filter housing cover 4. This means that the follower device 18 cannot rotate, or only minimally, relative to the filter housing cover 4. The base section 46 includes a tubular first section 47 as well as a tubular second section 48 that are connected to each other as one piece by means of the web sections 49.

A plate-shaped end section 50 adjoins the second section 48 and is provided, in turn, with a first follower counter element 51 as well as a second follower counter element 52. The first follower counter element 51 is correlated in this context with the follower element 30 and the second follower counter element 52 is correlated with the second follower element 31. The first follower counter element 51 includes a first mating surface 53 which corresponds with the first traction surface 32 and the second follower counter element 52 includes a second mating surface 54 which corresponds with the second traction surface 33. This means that upon pulling out the filter element 19 from the filter housing pot 3 by means of the follower device 18, the first mating surface 53 is resting against the first traction surface 32 and the second mating surface 54 is resting against the second traction surface 33.

The first follower counter element 51 includes a width b51 and the second follower counter element 52 includes a width b52. The width b52 is greater than the width b51. The width b51 of the first follower counter element 51 is preferably slightly smaller than the width b34 of the first insertion groove 34 so that the first follower counter element 51 can be inserted through the first insertion groove 34 into the support tube 21. The width b52 of the second follower counter element 52 is in particular slightly smaller than the width b35 of the second insertion groove 35 so that the second follower counter element 52 can be inserted through the second insertion groove 35 into the support tube 21. The follower counter elements 51, 52 are positioned at the angle α relative to each other.

Figure 8:
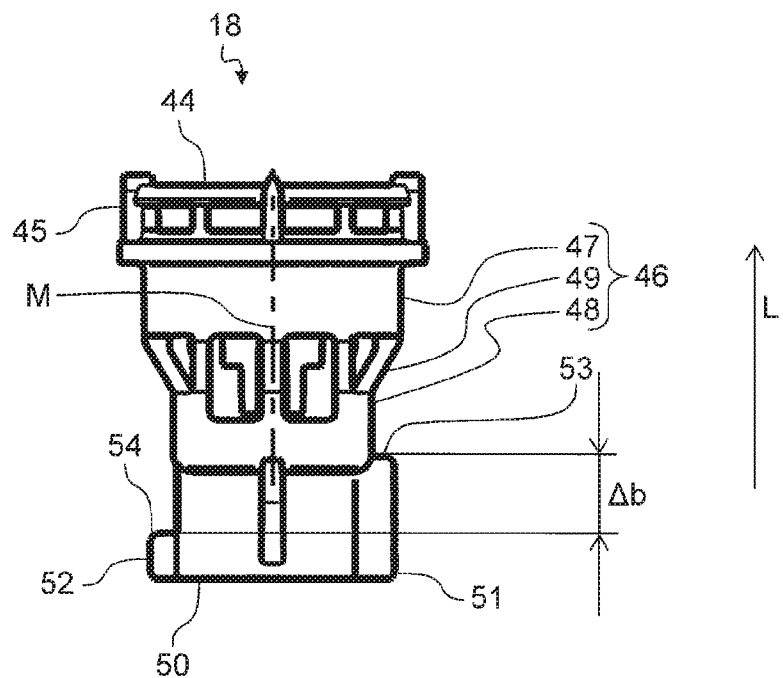
FIG. 8 shows a schematic side view of the follower device according to FIG. 6.
Figure 9:
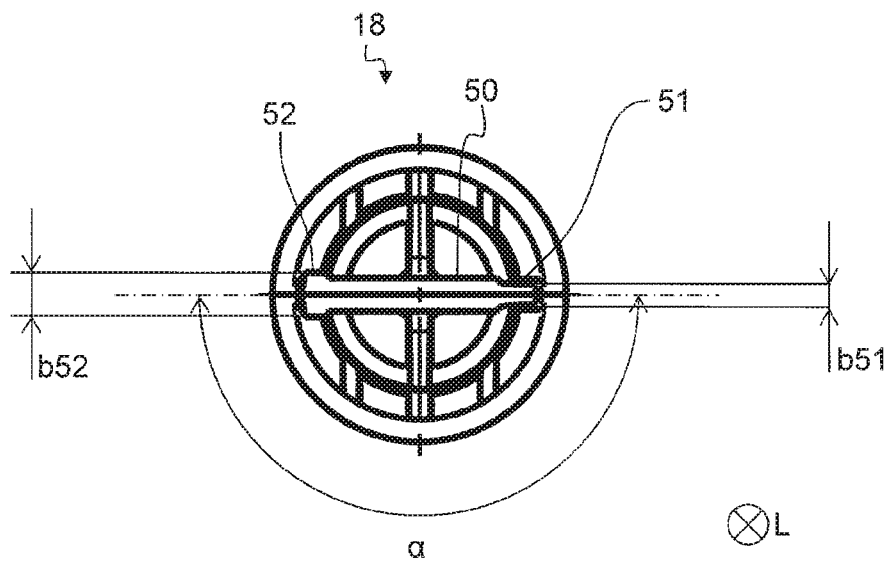
FIG. 9 shows a schematic plan view of the follower device according to FIG. 6.
Figure 10:
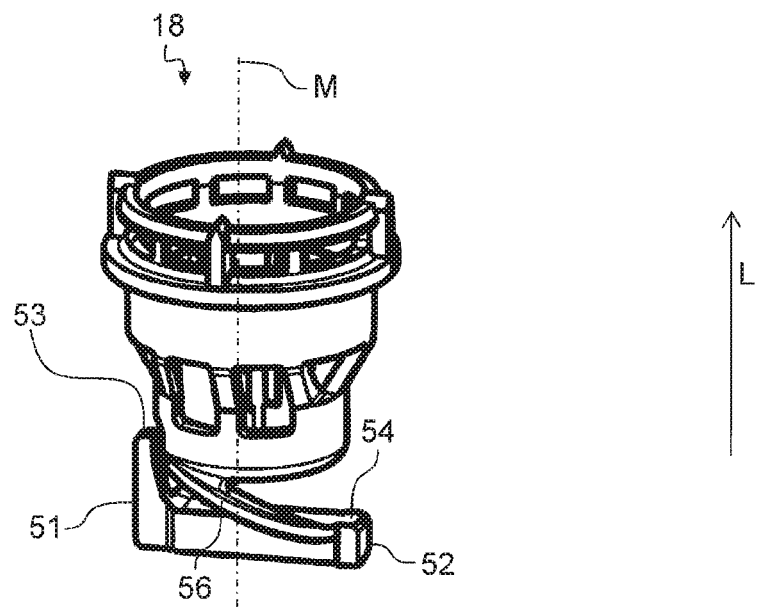
FIG. 10 shows a schematic perspective view of a further embodiment of a follower device for the filter assembly according to FIG. 1.
Figure 11:
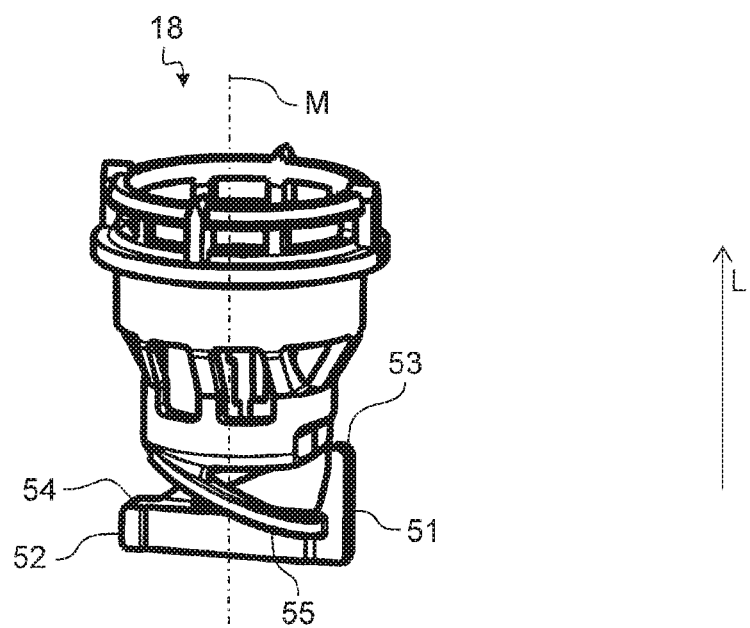
FIG. 11 shows a further schematic perspective view of the follower device according to FIG. 10.
Figure 12:
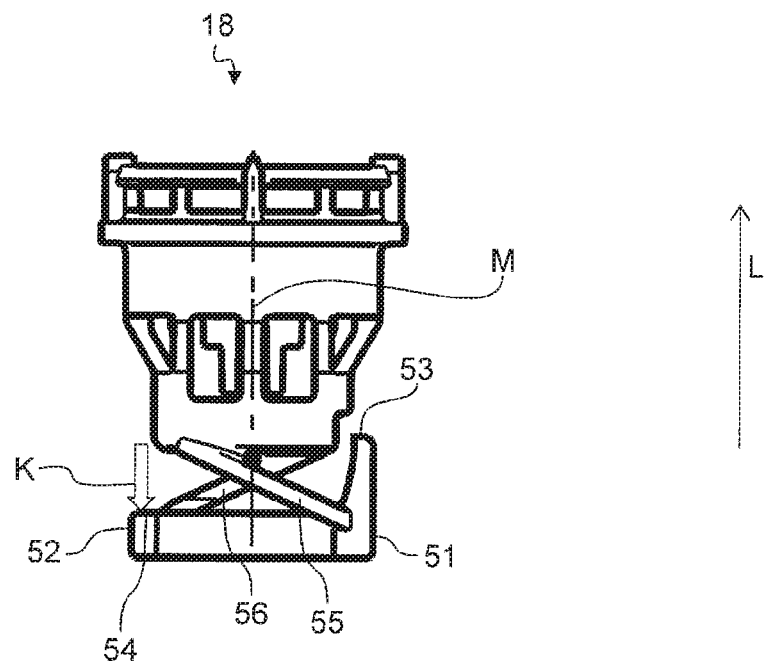
FIG. 12 shows a schematic side view of the follower device according to FIG. 10.
Figure 13:
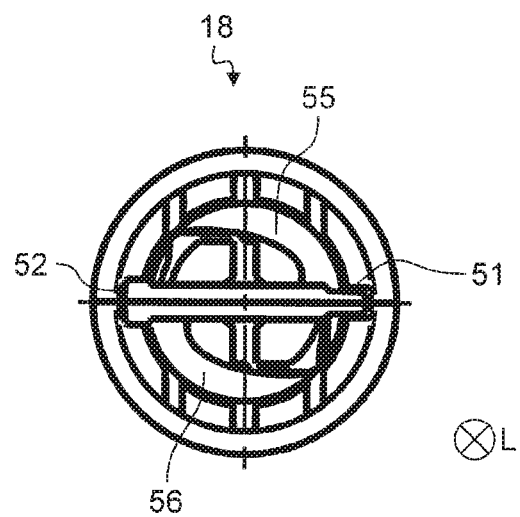
FIG. 13 shows a schematic plan view of the follower device according to FIG. 10.

As illustrated in FIG. 8, the first mating surface 53 and the second mating surface 54, viewed in the longitudinal direction L, are positioned spaced apart from each other. In particular, the mating surfaces 53, 54 are positioned spaced apart from each other by a distance Δb. The distance Δb is preferably identical to the distance Δa of the traction surfaces 32, 33 from each other. The two distances Δa, Δb have preferably such tolerances that in the mounted state of the follower device 18 each traction surface 32, 33 contacts its correlated mating surface 53, 54.

Due to the different widths b51, b52 of the follower counter elements 51, 52, the follower device 18 can be inserted only in one position through the insertion grooves 34, 35. For this purpose, the follower device 18 can be placed onto the surfaces 36, 40 and rotated relative to the filter element 19. As soon as the follower device 18 is rotated into the only possible correct position relative to the filter element 19, the follower counter elements 51, 52 glide into the insertion grooves 34, 35. The insertion ramps 37, 38, 41, 42 facilitate in this context insertion of the follower counter elements 51, 52 into the insertion grooves 34, 35.

After the follower device 18 has been inserted into the support tube 21, it is rotated relative to the support tube 21 so that the follower counter elements 51, 52 are pushed against the stop surface 39, 43 of the follower elements 30, 31. The follower counter elements 51, 52 engage then from behind the follower elements 30, 31 with form fit. For mounting the filter assembly 1, the filter element 19 together with the follower device 18 can now be inserted into the filter housing pot 3. Alternatively, the filter element 19 can also be inserted without the follower device 18 into the filter housing pot 3. In this case, the follower device 18 is mounted at a later point in time. Upon screwing on the filter housing cover 4, to which the filter element 19 is coupled by means of the follower device 18, a precise angular positioning of the filter element 19 in the filter housing pot 3 can thus be achieved.

For demounting the filter assembly 1, for example, in a service situation, the filter element 19 can be pulled out of the filter housing pot 3 by means of the follower device 18 when unscrewing the filter housing cover 4 from the filter housing pot 3. Upon unscrewing the filter housing cover 4, the follower device 18 rotates relative to the filter element 19 until the follower counter elements 51, 52 contact the corresponding stop surfaces 39, 43 of the follower elements 30, 31. The follower counter elements 51, 52 then engage from behind the follower elements 30, 31 with form fit. As soon as the follower counter elements 51, 52 contact the stop surfaces 39, 43, the filter element 19 rotates upon unscrewing the filter housing cover 4 together with the latter.

By means of the geometric configuration of the follower elements 30, 31, respectively, of the follower counter elements 51, 52, it is thus possible to realize an arbitrary drainage control when unscrewing the filter housing cover 4. The drainage control can be, for example, the aforementioned double-concentric sealing action of the filter element 19 in the filter housing pot 3 by means of the sealing elements 27, 28, a centrally or eccentrically arranged pin or plunger, or a discharge valve. Due to the different geometric configurations of the follower elements 30, 31, respectively, of the follower counter elements 51, 52, a key-lock system can moreover be realized so that mounting and demounting of a filter element not belonging to the filter assembly 1 is not possible. Faulty mounting is thereby prevented. The element of the drainage control can be provided at the second end disk 24; it can be, for example, an eccentric or coaxial sealing element (relative to the longitudinal direction L).

FIGS. 10 to 13 show a further embodiment of a follower device 18 as explained above. The follower device 18 according to FIGS. 10 to 13 differs from the follower device 18 according to FIGS. 6 to 9 only in that the first follower counter element 51 includes a first spring section 55 and the second follower counter element 52 a second spring section 56. The spring sections 55, 56 are deformable resiliently.

In case that only one of the mating surfaces 53, 54 is loaded with a force K (FIG. 12), the corresponding mating surface 53, 54 tilts, in this case the second mating surface 54, relative to the longitudinal direction L. This means that the filter element 19 can be pulled out of the filter housing 2 only when both mating surfaces 53, 54 are simultaneously loaded with the force K. This is the case only when the filter element 19 includes two traction surfaces 32, 33. In case a filter element is used which only provides one such traction surface 32, 33, at least one of the spring sections 55, 56 deforms resiliently so that the corresponding mating surface 53, 54 is tilted. In this way, the filter element jams in the filter housing pot 3 whereby demounting of the filter element is not possible or at least made difficult.

Figure 14:
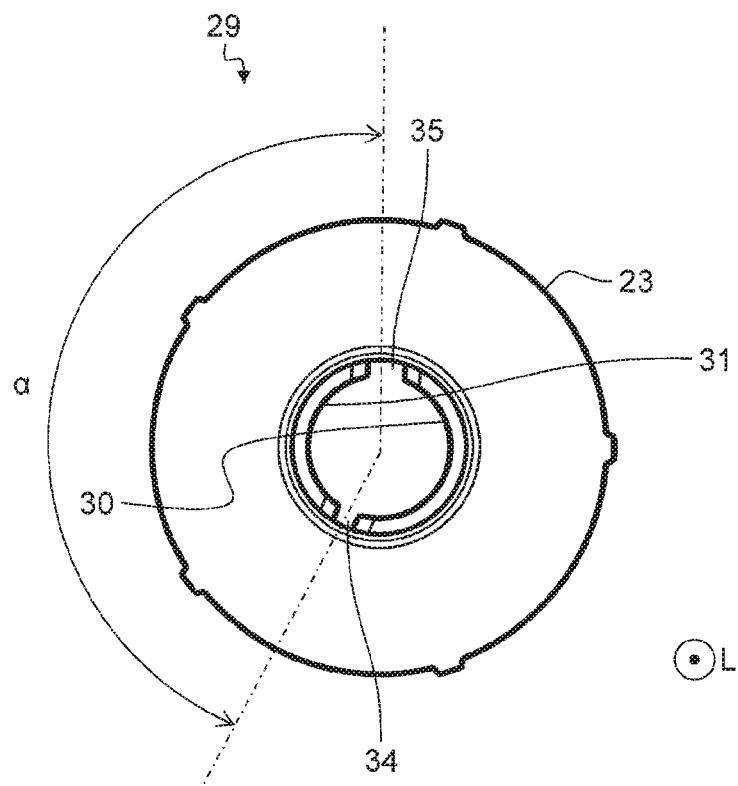
FIG. 14 shows a schematic plan view of a further embodiment of a support structure for a filter element for the filter assembly according to FIG. 1.
Figure 15:
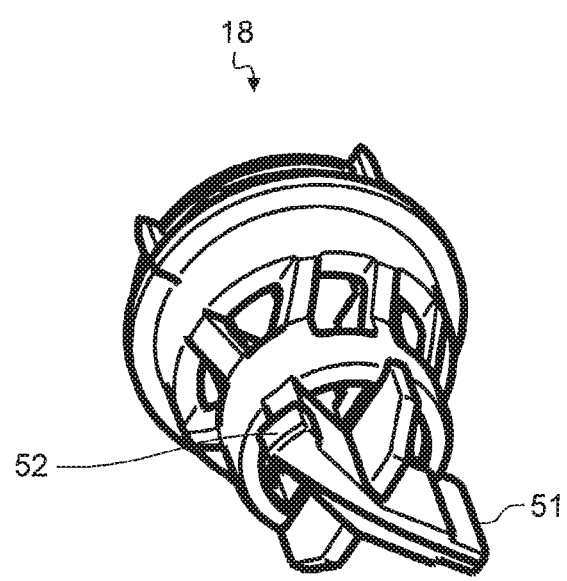
FIG. 15 shows a schematic perspective plan view of a further embodiment of a follower device for the filter assembly according to FIG. 1.
Figure 16:
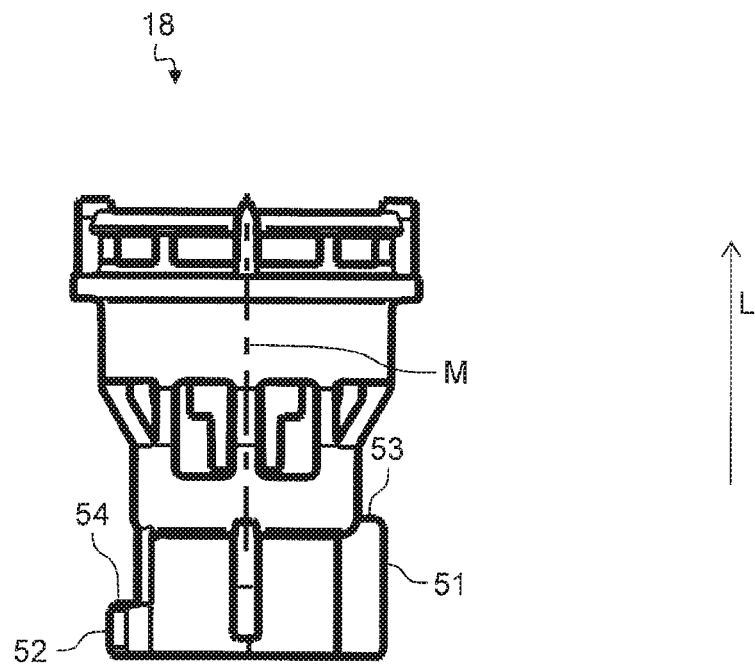
FIG. 16 shows a schematic side view of the follower device according to FIG. 15.
Figure 17:
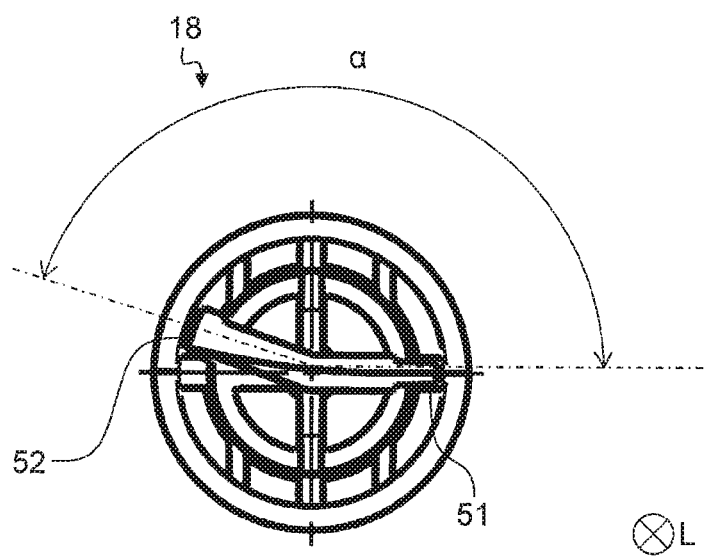
FIG. 17 shows a schematic plan view of the follower device according to FIG. 15.

FIG. 14 shows a further embodiment of a support structure 29 as explained above for a filter element 19 as explained above. In this embodiment of the support structure 29, again a first insertion groove 34 as well as a second insertion groove 35 are provided which are provided between a first follower element 30 and a second follower element 31 of a support tube 21, not illustrated. In this context, the already afore explained angle α between the two insertion grooves 34, 35 is different from 180°. For example, the angle α is 140°, 150°, 160°, 170 or the like. Correspondingly, a follower device 18 illustrated in FIGS. 15 to 17 is adjusted to the changed support structure 29. This means the angle α between the first follower counter element 51 and the second follower counter element 52 is different from 180°. In other respects, the follower device 18 according to FIGS. 15 to 17 does not differ from the follower device 18 according to FIGS. 6 to 9. In addition, the follower device 18 illustrated in FIGS. 15 to 17 can be provided also with the spring sections 55, 56 shown in FIGS. 10 to 13.

LIST OF REFERENCE CHARACTERS 1 filter assembly
2 filter housing
3 filter housing pot
4 filter housing cover
5 base section
6 inner thread
7 bottom
8 outlet pipe
9 groove
10 outlet
11 upper edge
12 base section
13 outer thread
14 flange
15 bottom
16 grip section
17 connecting element
18 follower device
19 filter element
20 filter medium
21 support tube
22 interior
23 end disk
24 end disk
25 flow direction
26 flange
27 sealing element
28 sealing element
29 support structure
30 follower element
31 follower element
32 traction surface
33 traction surface
34 insertion groove
35 insertion groove
36 surface
37 insertion ramp
38 insertion ramp
39 stop surface
40 surface
41 insertion ramp
42 insertion ramp
43 stop surface
44 annular section
45 web section
46 base section
47 section
48 section
49 web section
50 end section
51 follower counter element
52 follower counter element
53 mating surface
54 mating surface
55 spring section
56 spring section
a32 distance
a33 distance
b34 width
b35 width
b51 width
b52 width
E section plane
K force
L longitudinal direction
M symmetry axis
RL clean side
RO raw side
α angle
Δa distance
Δb distance

What is claimed is:

1. A filter element comprising:
   a filter medium body surrounding an interior of the filter element at least partially circumferentially:
   a first follower element comprising
     a first traction surface,
       wherein the first traction surface is configured to interact with a corresponding first mating surface of a filter housing;
   a second follower element comprising
     a second traction surface,
       wherein the second traction surface is configured to interact with a corresponding second mating surface of the filter housing;
   wherein the first and second traction surfaces are configured to interact with the first and second mating surfaces such that the filter element can be pulled out of the filter housing when the first and second traction surfaces interact with the first and second mating surfaces;
wherein the first traction surface and the second traction surface are arranged at a distance from each other along a longitudinal axis of the filter element;
wherein the first traction surface and the second traction surface project radially into the interior of the filter element;
wherein the first follower element and/or the second follower element comprises
a stop surface adjoining circumferentially the respective traction surface of the first follower element and/or the second follower element,
wherein, in a position of use of the filter element, the stop surface is configured to interact with a corresponding counter stop surface of the filter housing to form an at least unidirectionally acting rotational degree of freedom blocking about the longitudinal axis of the filter element relative to the filter housing,
wherein between the first follower element and the second follower element
a first insertion groove and a second insertion groove are provided.

2. The filter element according to claim 1, wherein the first insertion groove and the second insertion groove have a different width.

3. The filter element according to claim 1, wherein the first insertion groove and the second insertion groove are positioned at an angle different from 180° relative to each other.

4. The filter element according to claim 1, wherein the first insertion groove and the second insertion groove have a different width and
wherein the first insertion groove and the second insertion groove are positioned at an angle different from 180° relative to each other.

5. A filter assembly comprising:
a filter housing comprising a first mating surface and a second mating surface, wherein the first mating surface and the second mating surface are arranged at a distance from each other along a longitudinal axis of the filter housing;
a filter element comprising:
a filter medium body surrounding an interior of the filter element at least partially circumferentially:
a first follower element comprising
a first traction surface,
wherein the first traction surface is configured to interact with the first mating surface of the filter housing;
a second follower element comprising
a second traction surface,
wherein the second traction surface is configured to interact with the second mating surface of the filter housing;
wherein the first and second traction surfaces are configured to interact with the first and second mating surfaces such that the filter element can be pulled out of the filter housing when the first and second traction surfaces interact with the first and second mating surfaces;
wherein the first traction surface and the second traction surface are arranged at a distance from each other along a longitudinal axis of the filter element;
wherein the first traction surface and the second traction surface project radially into the interior of the filter element;
wherein the first follower element and/or the second follower element comprises
a stop surface adjoining circumferentially the respective traction surface of the first follower element and/or the second follower element,
wherein, in a position of use of the filter element, the stop surface is configured to interact with a corresponding counter stop surface of the filter housing to form an at least unidirectionally acting rotational degree of freedom blocking about the longitudinal axis relative to the filter housing,
the filter assembly further comprising
a follower device,
wherein the filter housing further comprises
a filter housing cover,
wherein the follower device is connected to the filter housing cover,
wherein the follower device comprises
a first follower counter element and
a second follower counter element,
wherein the first follower counter element comprises the first mating surface, and
wherein the second follower counter element comprises
the second mating surface,
wherein the first follower counter element comprises
a first spring section and
the second follower counter element comprises
a second spring section,
wherein the first spring section and the second spring section each are configured to deform resiliently when loading only one of the first and second mating surfaces with a force so that the mating surface loaded with the force tilts relative to a longitudinal direction of the filter housing.

6. A filter element comprising:
a filter medium body surrounding an interior of the filter element at least partially circumferentially, the filter medium body having a first longitudinal end face and a second longitudinal end face;
a first end disk arranged on the first longitudinal end face;
wherein axial, as used herein, is a direction parallel to a longitudinal axis (L) arranged within and extending through the interior of the filter element from the first longitudinal end face to the second longitudinal end face;
a first follower element connected directly or indirectly to the first end disk and arranged in the interior of the filter element, the first follower element projecting radially inwardly towards the longitudinal axis (L) to a radially inner end;
a first traction surface,
wherein the first traction surface is configured to interact with a corresponding first mating surface of a filter housing;
a second follower element connected directly or indirectly to the first end disk and arranged in the interior of the filter element, the second follower element and projecting radially inwardly towards the longitudinal axis (L) to a radially inner end;
a second traction surface,
wherein the second traction surface is configured to interact with a corresponding second mating surface of the filter housing;

wherein the first and second traction surfaces are configured to interact with the first and second mating surfaces such that the filter element can be pulled out of the filter housing when the first and second traction surfaces interact with the first and second mating surfaces;

wherein the first traction surface and the second traction surface each comprise a plane oriented normal to the longitudinal axis, respectively;

wherein the first traction surface and the second traction surface are axially spaced apart from each other along the longitudinal axis (L) of the filter element;

wherein both the first and the second follower elements are arranged axially nearer to the first longitudinal end face than to the second longitudinal end face;

wherein the first follower element and/or the second follower element comprises
- a stop surface adjoining circumferentially the respective traction surface of the first follower element and/or the second follower element,
- wherein, in a position of use of the filter element, the stop surface is configured to interact with a corresponding counter stop surface of the filter housing to form an at least unidirectionally acting rotational degree of freedom blocking about the longitudinal axis of the filter element relative to the filter housing
- a support tube arranged in the interior of the of the filter element, supporting a radially inner flow face of the filter medium body;
- wherein the radially outer end of the follower elements are connected directly to the support tube;
- wherein the support tube is connected to the first end disk.

7. The filter element according to claim 6, wherein the stop surface is oriented normal to the respective traction surface of the first follower element and/or the second follower element.

8. The filter element according to claim 6, wherein the stop surface projects radially into the interior of the filter element parallel to the longitudinal axis of the filter element.

9. The filter element according to claim 6, wherein the filter element is a round filter element comprising a hollow cylindrical shape.

10. The filter element according to claim 6, further comprising
a support tube arranged in the interior of the filter element,
wherein the first follower element comprising
the first traction surface and
the second follower element comprising
the second traction surface are provided at the support tube.

11. A filter assembly comprising:
a filter housing comprising the first mating surface and the second mating surface, wherein the first mating surface and the second mating surface are arranged at a distance from each other along a longitudinal axis of the filter housing;
a filter element according to claim 6
wherein the first traction surface is configured to interact with the first mating surface of the filter housing;
wherein the second traction surface is configured to interact with the second mating surface of the filter housing;
wherein the first and second traction surfaces are configured to interact with the first and second mating surfaces such that the filter element can be pulled out of the filter housing when the first and second traction surfaces interact with the first and second mating surfaces;
wherein the first traction surface and the second traction surface project radially into the interior of the filter element;
wherein, in a position of use of the filter element, the stop surface is configured to interact with the corresponding counter stop surface of the filter housing to form an at least unidirectionally acting rotational degree of freedom blocking about the longitudinal axis relative to the filter housing.

12. The filter assembly according to claim 11, further comprising
a follower device,
wherein the filter housing comprises
a filter housing cover,
wherein the follower device is connected to the filter housing cover,
wherein the follower device comprises
a first follower counter element and
a second follower counter element,
wherein the first follower counter element comprises the first mating surface, and
wherein the second follower counter element comprises
the second mating surface.

13. The filter assembly according to claim 12, wherein the first follower counter element and the second follower counter element have a different width.

14. The filter assembly according to claim 12, wherein the first follower counter element and the second follower counter element are positioned at an angle different from 180° relative to each other.

15. The filter assembly according to claim 12, wherein the first follower counter element and the second follower counter element have a different width and
wherein the first follower counter element and the second follower counter element are positioned at an angle different from 180° relative to each other.

* * * * *